United States Patent
Fritzsche et al.

(10) Patent No.: US 6,577,945 B2
(45) Date of Patent: Jun. 10, 2003

(54) METHOD AND APPARATUS FOR DETECTING SPARK FAILURE BASED ON THE NUMBER OF CRANKSHAFT REVOLUTIONS

(75) Inventors: Martin Fritzsche, Biberach (DE); Otto Loehlein, Illerkirchberg (DE); Joerg Remele, Hagnau (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 258 days.

(21) Appl. No.: 09/820,322

(22) Filed: Mar. 29, 2001

(65) Prior Publication Data

US 2001/0047683 A1 Dec. 6, 2001

(30) Foreign Application Priority Data

Mar. 29, 2000 (DE) .......................... 100 15 573

(51) Int. Cl.$^7$ .......................... F02D 41/00; G06G 19/00
(52) U.S. Cl. .................. 701/111; 701/114; 701/102; 701/115; 123/406.6; 123/406.65
(58) Field of Search ................ 701/111, 114, 701/110, 115, 101, 102; 123/406.6, 406.65, 406.12, 406.15

(56) References Cited

U.S. PATENT DOCUMENTS

| | | | |
|---|---|---|---|
| 4,406,265 A | * 9/1983 | Brandt et al. | 123/406.42 |
| 5,255,560 A | 10/1993 | Klenk et al. | 73/116 |
| 5,606,119 A | * 2/1997 | Wallerand et al. | 73/117.3 |
| 5,709,192 A | 1/1998 | Zimmermann | 123/436 |
| 5,740,045 A | * 4/1998 | Livshiz et al. | 701/101 |
| 6,012,427 A | * 1/2000 | Hoy et al. | 123/406.6 |
| 6,082,330 A | 7/2000 | Alberter et al. | 123/436 |
| 6,185,928 B1 | * 2/2001 | Wallerand et al. | 123/406.29 |
| 6,253,145 B1 | * 6/2001 | Garrard et al. | 701/113 |
| 2002/0189588 A1 | * 12/2002 | Umemoto | 123/406.47 |

FOREIGN PATENT DOCUMENTS

| | | |
|---|---|---|
| DE | 195 48 604 | 2/1997 |
| DE | 194 40 675 | 4/1997 |
| DE | 196 33 066 | 4/1998 |
| EP | 0 474 652 | 3/1992 |

OTHER PUBLICATIONS

Schneider "Lexikon der Informatik und Datenverarbeitung" [Encyclopedia of Information Systems and Data Processing], 3$^{rd}$ Edition, 1991.
Barkat, Signal Detection and Estimation, 1991.
Haykin, Unsupervised Adaptive Filtering, vol. 1: Blind Source Separation.
Schürmann, Polynomklassifikatoren für die Zeichenerkennung (Polynomial Classification processes for Sign Recognition), 1977.

* cited by examiner

Primary Examiner—Hieu T. Vo
(74) Attorney, Agent, or Firm—Crowell & Moring LLP

(57) ABSTRACT

A novel method and a suitable device for the cylinder-specific determination of spark failures on a reciprocating engine through a classifying unit based on measurement data that contain information about the number of crankshaft revolutions. For this process, the measurement data are subjected to a pre-processing procedure in the classifying unit and classified through a classification process, wherein within the framework of the pre-processing procedure the data are subjected to a principal axis transformation (HAT). Due to the utilization of this resource-saving method for detecting spark failures on reciprocating engines in accordance with the invention, the processing requirements for once cycle are less than 5 Kflops, despite a measurement vector v length of 240. Due to the fact that the invented device requires only a single measurement data recorder, e.g. in the form of a simple gear ring that is attached to the crankshaft and coupled to a motion sensor, even the mechanical design can be produced inexpensively and it can be decoupled from thermal or other negative influences of the environment in a simple manner.

11 Claims, 1 Drawing Sheet

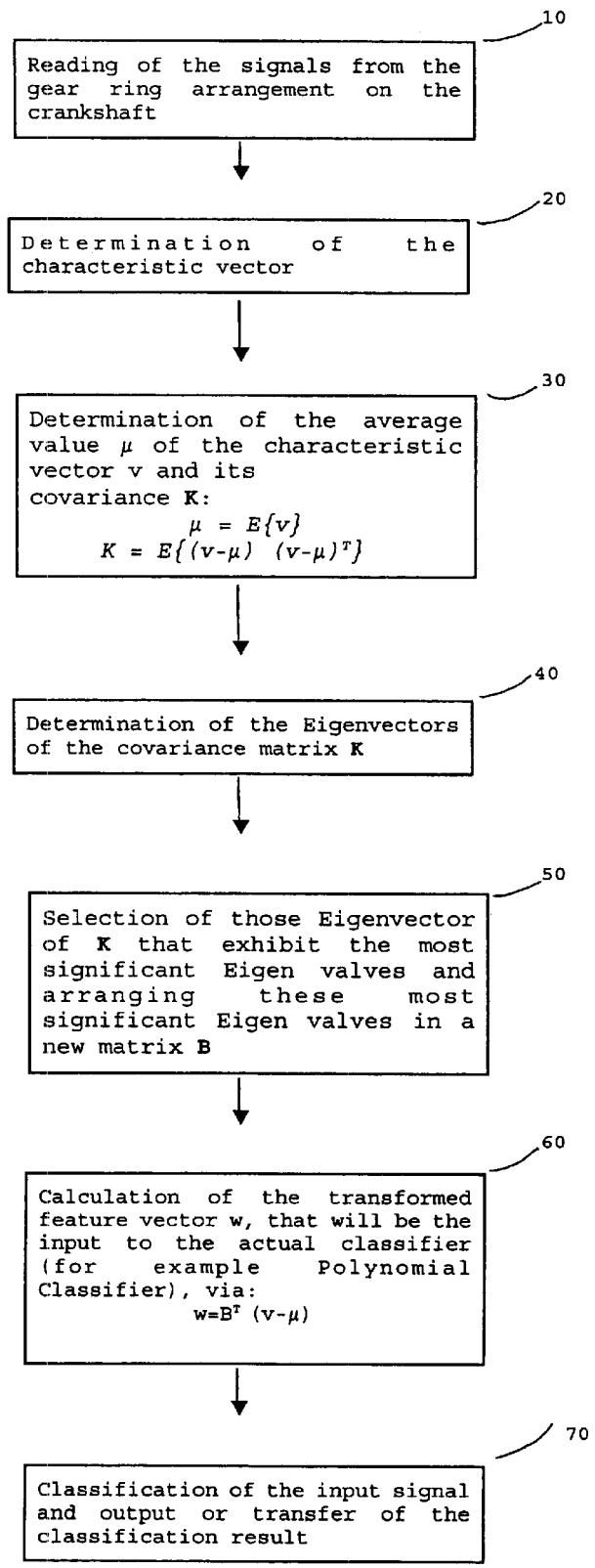

METHOD AND APPARATUS FOR DETECTING SPARK FAILURE BASED ON THE NUMBER OF CRANKSHAFT REVOLUTIONS

BACKGROUND AND SUMMARY OF THE INVENTION

This application claims the priority of German Patent Document 100 15 573.1, filed in Germany on Mar. 29, 2000, the disclosure of which is expressly incorporated by reference herein.

The invention relates to a method and a device for the cylinder-specific determination of spark failures on a reciprocating engine through a classification process based on the crankshaft rotational velocity (r.p.m.), wherein before the classification process the information on the crankshaft r.p.m. is subjected to a transformation, which separates the information into uncorrelated components.

Within the framework of the monitoring process for the engine condition, it is important to recognize spark failures among the individual cylinders of an engine in order to be able to influence the resulting uneven running behavior of the engine by influencing the combustion process in the individual cylinders.

From European Patent Document EP 0474652 B1, corresponding U.S. Pat. No. 5,255,560 we know of a method that measures the erratic running values of an engine under consideration of the time frames of the combustion cycles of different groups of cylinders. The erratic running value calculated this way is then utilized in an idle adjustment process.

In German Patent Document E 19548604 C1, corresponding U.S. Pat. No. 5,709,192 a method for determining non-uniform cylinder torques based on engine r.p.m. is described. On the basis of the signal issued by the speed governor, the torque moments of the individual cylinders are determined. When conducting the method it is important that individual cylinders of the engine can be shut off selectively during operation of the engine.

The method described in patent German Patent Document DE 19633066 C2, corresponding U.S. Pat. No. 6,082,330 allows the deduction of various parameters from the curve of the current crankshaft r.p.m. in a cylinder-selective and r.p.m.—dependent manner; these parameters are correlated to the respective medium pressure of the engine's combustion chambers.

The method described in German Patent Document DE 19540675 C1 involves an estimation process for the torque of a reciprocating engine, based on a physical-mathematical example, from the crankshaft r.p.m. Through a modeling process, the gas moment of selected cylinders of the engine is deduced from the r.p.m. values. By subtracting a mean value from the cylinder-selective values a residuum is obtained, which indicates a combustion failure when exceeding a threshold value. We are familiar with methods for differentiating and/or classifying various signals from the areas of data processing and pattern recognition. Common encyclopedias (e.g. H.-J. Schneider "Lexikon der Informatik und Datenverarbeitung" [Encyclopedia of Information Systems and Data Processing], $3^{rd}$ Edition, 1991, R. Odenbourg Publishing Co., Munich, Germany) define the basic terms, and text books (such as M. Barkat, Signal Detection and Estimation, 1991, Artech House Inc. or S. Haykin, Unsupervised Adaptive Filtering, Volume 1: Blind Source Separation, John Wiley & Sons, 2000) describe specific methods. Suitable classification processes for pattern recognition tasks are mentioned in text books on numerous occasions, e.g. J. Schürmann, Polynomklassifikatoren für die Zeichenerkennung (Polynomial Classification processes for Sign Recognition), 1977, R. Oldenburg Publishing Co., Munich, German; this one is adjusted specifically to optical character recognition.

An object of the invention and apparatus is to find a novel method for the cylinder-specific determination of spark failures on a reciprocating engine, wherein a classification unit uses measurement data that contains information about the number of crankshaft revolutions.

The object achieved according to preferred embodiments of the invention with the help of a classification unit in which the data are subjected to a pre-processing step and classified with the help of a classification process, wherein within the framework of the pre-processing step the data are subjected to a transformation, which separates this data into uncorrelated components.

The present invention provides for a simple method of transforming the reading of signals from a gear ring arrangement on the crankshaft to a recognition of spark failures, and identification of incorrectly functioning cylinders which eliminates the requirement for complex models or the requirement for significant computer power or significant operational knowledge concerning the mechanics of propulsion engine. This method involves a diagnostic tool based on the transformation of vectors containing related signals in an orthogonal space and the reduction in the dimensionality of the feature space to be handled by a classifier.

In a beneficial manner, the invention permits the recognition of spark failures and the identification of incorrectly functioning cylinders even on engines that have a time-overlapping effect of the individual cylinders' pulse responses to the r.p.m. signal (e.g. 16-cylinder engines). The complex vibration behavior of the crankshaft caused by this does not have to be simulated with comprehensive mathematical examples (differential equations).

BRIEF DESCRIPTION OF THE DRAWINGS

The sole FIGURE is a flow chart representing the method of the present invention based on the reading of signals from a gear ring arranged on a crankshaft.

DETAILED DESCRIPTION OF THE PREFERRED EMBODIMENT

The method of the present invention can be performed independent of the number of cylinders and the current engine r.p.m. so that only the signal of the crankshaft r.p.m. is required. This way it is possible, for example, to record the dynamic behavior of the crankshaft r.p.m. by simply attaching a gear ring to the crankshaft in connection with a proximity sensor (preferably Hall sensor), which records the rotation of the gear ring based on the passage of the individual teeth as illustrated in step 10 of the FIGURE. Since this device in general is already part of the adjustment process, the invented method normally does not require appropriate mechanical modifications to the reciprocating engine.

Generally, each cycle of an engine that must be analyzed for detecting spark failures consists of two revolutions of the crankshaft. If, for example, the gear ring that has been attached to the crankshaft for the purpose of detecting the dynamic behavior of the crankshaft r.p.m. contains 120 teeth, then the information that is allocated to a single cycle is composed of 240 individual signals, which are supplied by the proximity sensor that is connected to the gear tooth. The amplitude of each individual signal is directly proportional to the time $\Delta t$ between the passings of two neighboring teeth of the gear ring on the proximity sensor. This way, the individual signals can be interpreted as direct information about the dynamic behavior of the crankshaft r.p.m.

In order to be able to conduct an automatic classification of the information, the individual signals that are allocated to a cycle (characteristics of the event or object that is supposed to be classified) are summarized, as shown in step 20, in a clear sequence into a so-called characteristic vector v, i.e. one cycle corresponds to one vector.

In a beneficial version, the characteristic vectors generated this way are subjected to a simple principal axis transformation (HAT), also called Karhunen-Loève transformation (KLT). The goal of this transformation is to be able to depict the characteristic vectors by projecting them into a different space that has been specially adapted to the method or object that is supposed to be classified (transformation space). In this space, the varying types of conditions and states that are supposed to be classified appear in a more differentiated manner.

In the task of detecting spark failures, which is the subject of the invention, it is beneficial to calculate, as in step 30, the mean value $\mu$ of the column-shaped characteristic vector upon its generation (equation 1) and subsequently form the appropriate covariance matrix K (equation 2):

$$\mu = E\{v\} \qquad \text{(equation 1)}$$

$$K = E\{(v-\mu)(v-\mu)^T\} \qquad \text{(equation 2)}$$

From the covariance matrix K the characteristic functions are obtained, which depict the spatial axes of the transformation space. In other words, the Eigenvectors of K that have the most significant value are arranged is a matrix B as indicated in steps 40 and 50. The principal axis transformation HAT, which is now applied to this covariance matrix K, rotates the covariance matrix K in a principal axis or characteristic system, in which the signals are uncorrelated to each other (equation 3). Here, the HAT simultaneously establishes the ranking among the individual coordinate directions. Those signals (characteristic vectors of the transformed matrix) that have the largest characteristic values and thus the largest variance provide the most information.

$$W = B^T(v-\mu) \qquad \text{(equation 3)}$$

wherein
v=signals arranged as matrix (1 cycle per column)
B=matrix of the first M characteristic vectors of the covariance matrix K,
sorted by descending characteristic value
w=transformed vectors (characteristic vectors that can be fed to a classification process)

A principle advantage of the application of the principal axis transformation for the purpose of processing measurement data consists of the fact that the measurement data are transformed directly. Pre-processing steps, such as the complex calculation of frequency spectra (FFT), are eliminated.

Application of the HAT within the framework of the task of the invention showed that only a very small number M of characteristic values has a significant rate so that only a small number of characteristic vectors must be included in the calculation of the characteristic vectors w. This in turn results in a small dimension of w, which directly influences the dimensioning of the subsequent classification process in a beneficial manner.

The classification process in step 70 following the HAT can be a standard classification process. The use of a square polynomial classification process, as we know it generally from literature, has proven to be beneficial. Due to its simple structure, the classification process requires little computing capacity and memory. Before its usage with measurement data that correspond to the operating data that are supposed to be classified, the classification process must be adjusted in the usual manner known to the expert.

During this process it turned out that very good classification results can already be achieved when using characteristic vectors w that contain only 7 characteristics. It is remarkable that spark failures during engine revolutions within a very wide range (800–1,800 rpm) can be allocated with a single classification process.

In another beneficial embodiment of the invention, it is also feasible to employ the Independent Component Analysis, also called blind signal separation, instead of the principal axis transformation (HAT) for generating uncorrelated signal components. In this instance, the signal components that are used for forming the characteristic vectors are not only uncorrelated, but also independent from each other.

In order to further improve classification results, it is beneficial to correct the mean values of the measurement signals before the transformation into uncorrelated components. It is also feasible to subject the measurement signals to a low-pass filtration process before processing them further in order to eliminate high-frequency interference; for this procedure a zero-phase filter should be used. It is also useful to take the mean of the signals over several cycles of the engine (e.g. 5–10 cycles).

Due to the utilization of this resource-saving method for detecting spark failures on reciprocating engines in accordance with the invention, the processing requirements for once cycle are less than 5 Kflops, despite a measurement vector v with a length of 240.

Due to the fact that the invented device requires only a single measurement data recorder, e.g. in the form of a simple gear ring that is attached to the crankshaft and coupled to a motion sensor, even a possibly required mechanical modification of the reciprocating engine can be performed inexpensively. Additionally, the invented device can be de-coupled from thermal or other negative influences of the environment without difficulty due to its simple design.

What is claimed is:

1. A device for cylinders specific determination of spark failures of a reciprocating engine, comprising:

a gear ring arrangement attached to a crankshaft of said engine, said gear ring including a plurality of teeth;

sensing means in proximity to said gear ring for measuring dynamic behavior of the crankshaft by measuring time between passing of two neighboring teeth of said plurality of teeth and providing individual output signals allocated to a cycle of said crankshaft;

means for summing said individual signals into a characteristic vector associated with each cycle and outputting said characteristic vectors;

means for subjecting said characteristic vectors to a principle axis transformation;

means for determining an average value of each of said characteristic vectors and a covariance matrix of said characteristic vectors;

means for determining Eigenvectors of said covariance matrix;

means for selecting ones of said Eigenvectors that exhibit most significant Eigen values and arranging said most significant Eigen values in a second matrix V;

means for calculating a transformed feature vector as a function of said new matrix V, said characteristic vector and said average value of said characteristic vector;

means for classifying said transformed feature vector and outputting the result of said classification.

2. The device according to claim 1, wherein said average value $\mu$ of the characteristic value v and its covariance matrix K are determined by the formulations:

$$\mu = E\{v\}$$

$$K = E\{(v-\mu)(v-\mu)^T\}.$$

3. The device according to claim 1, wherein said principle axis transformation rotates the covariance matrix K in a principle axis or characteristic system in which the signals are not correlated with each other.

4. The device according to claim 1, wherein said classification process is a square Polynomial Classification process.

5. The device according to claim 1, wherein said plurality of teeth of said gear ring is 120 teeth and wherein information for each single cycle is composed of 240 individual signals supplied by said sensing means.

6. A method for determining cylinder-specific spark failures of a reciprocating engine, said method comprising the steps of:

obtaining measurement data concerning the number of crankshaft revolutions of said reciprocating engine;

subjecting said measurement data to a preprocessing procedure including a transformation process which separates the data into uncorrelated components and providing a pre-processing output;

subjecting said pre-processing output containing said uncorrelated components to a classification process to provide said cylinder-specific spark failure determination.

7. The method according to claim 6, wherein said transformation process is a principle axis transformation (HAT).

8. The method according to claim 6, wherein the transformation process is an independent component analysis.

9. The method according to claim 6, further comprising the step of, prior to said transformation process, subtracting a mean value per cycle from said measurement data.

10. The method according to claim 6, further comprising the step of, prior to said transformation process, subjecting said measurement data to a low-pass filtration process through a zero-phase filter.

11. The method according to claim 6, further comprising the step of, prior to the transformation process, calculating the mean of the measurement data over a plurality of cycles.

* * * * *